United States Patent [19]

Martin et al.

[11] Patent Number: 5,550,755
[45] Date of Patent: Aug. 27, 1996

[54] APPARATUS AND METHOD FOR PATCH RECORDING AND RECALL

[76] Inventors: B. Morgan Martin, 1846 North Ave. 50, Los Angeles, Calif. 90042; Ian Eales, 24389 Crestlawn, Woodland Hills, Calif. 91367-3911

[21] Appl. No.: 274,963

[22] Filed: Jul. 14, 1994

[51] Int. Cl.⁶ .................................................. G06F 17/00
[52] U.S. Cl. ........................................................ 364/514 R
[58] Field of Search .................... 364/514 R, 474.24; 340/825.44, 815.47, 815.48, 815.49, 815.5, 815.53, 815.54, 825.21

[56] References Cited

U.S. PATENT DOCUMENTS

| | | | |
|---|---|---|---|
| 3,573,789 | 4/1971 | Sharp et al. | 340/825.44 |
| 3,573,792 | 4/1971 | Reed | 340/825.44 |
| 4,845,634 | 7/1989 | Vitek et al. | 364/474.24 |
| 5,111,408 | 5/1992 | Amjadi | 364/474.24 |
| 5,442,644 | 8/1995 | Heflin et al. | 395/184.01 |

*Primary Examiner*—Ellis B. Ramirez
*Attorney, Agent, or Firm*—Christie, Parker & Hale, LLP

[57] ABSTRACT

Patch recording and recall for audio and video consoles is accomplished by detectors uniquely associated with each jack detect the presence of a plug in the associated jack. The connection sensor provides a signal identifying that a connection has been made when a plug is inserted in the jack. A controller receiving the connection signals stores each consecutive connection signal in a memory. Since each connection signal is uniquely identified with a jack in the panel, the stored connection signals are subsequently retrieved by the controller and a patch signal corresponding to the retrieved connection signal indicating a unique jack for the patch to be reconstructed is provided by the controller. Interface with an operator/technician is accomplished through a standard VDU or other appropriate means such as a synthesized voice system.

25 Claims, 11 Drawing Sheets

5,550,755

APPARATUS AND METHOD FOR PATCH RECORDING AND RECALL

BACKGROUND OF THE INVENTION

1. Field of the Invention

The present invention is drawn generally to the recording of connections in a patch bay and recall of the recorded connections for repatching the bay in an identical configuration. More specifically, the invention provides a system employing sensors for detecting the presence of a plug in the jack and a controller which records sequential connections as indicated by the sensors. Memory in the controller allows recall of the consecutive patches to allow the patch bay to be configured with identical patching at a subsequent date.

2. Prior Art

Audio and video consoles used for multiple signal control in recording, broadcast, film post-production and other communications industry applications can have literally thousands of controls, any of which effect the quality of the signals passed through the console. Signals received by and transmitted from such consoles are typically routed by way of patch bays which incorporate individual transmission lines for each necessary signal. Setup of consoles and patch bays for particular applications requires considerable time on the part of operators and technicians. Using audio consoles as exemplary, operators spend considerable time setting controls on the console exactly as required to achieve the desired sounds and affects. Since the console setup is often used for more than one application or more than one performance, the individual control settings are recorded to allow identical setup of the console in the future. In addition, console setup may often take a significant period of time and may be interrupted by other projects requiring use of the console or unavailability of required equipment or personnel. In such cases, recording of the partially completed console setup is required to allow the project to be resumed subsequently.

Patching for signals to be controlled by the console must similarly be accomplished by technicians for each desired different use of the console. Differing equipment types, locations and the desired mixing of signals to be accomplished by the console may require significantly different patch setups in one or more patch bays, at the console, in the controls rooms, machine rooms and at the equipment. Patch bays generally consist of multiple rows of electrical jacks which are interconnected to various signal points on the console, in the studio, in the machine room or in other equipment locations. Individual patch cords with electrical plugs are connected in the patch bay to route signals from one jack to another creating a "patch." Recording of patches for various setups is required in a similar manner to recording of the console control settings to allow the patch bays to be configured identically for future uses.

Prior to 1980, recording of control settings on consoles and for the patch bays was done manually by the operators and technicians using manual techniques such as recording settings and patches in a log book or photographically recording the control settings and patch bay configuration. To reset the console and patch bays at a later date, the operators and technicians would obtain the manual records and compare the settings of controls on the console and patches to those record attempting to match the settings as accurately as possible. On complex consoles with potentially thousands of control settings, both the recording and resetting processes were very time consuming. In addition with manual recording, the potential for inaccuracy in the record was likely, particularly with the large number of settings to be recorded.

Solid State Logic of Oxford, England, developed and produced a semi-automated computer recall system for their product marketed as the Series 4000 audio console. Similar systems have been offered by other manufacturers including NEVE, also an English manufacturer previously located in Cambridge, England. Recently, a similar system marketed as Recall-By-Langley by Amek Systems and Controls, Ltd., Salfield, England, has been manufactured.

Each of these audio console recall systems incorporates extra "sections" on each potentiometer and switch in the console for identification of the position of that control. Circuits connecting a recording system to these extra sections, allows recording of control position. Digitization and storage of this data in digital format allows computer manipulation and display of the data. In existing audio consoles, the integrated computer provides for storage and recall of the console data and allows display of the control settings on a video display unit (VDU) using numerical or graphical displays to show current setting and the recorded setting for each control. Data manipulation in the computer allows display of only unmatched controls and, by monitoring control adjustment, the computer updates the display and when the current setting and recorded setting are matched, signals the operator and automatically steps to the next unmatched control on the VDU. Recallable console setting records, such as those described, provide significantly improved accuracy in preserving data defining the console settings for future uses and provides significant time savings for operators in both recording the settings and reconfiguring the console to match recorded settings.

Certain audio consoles additionally provide motorized positioning of controls based on the recorded data to completely automate the system.

While consoles have been fitted with the capability to recall settings in the prior art, patch bays comprise a critical element in setup of large scale audio and video systems and, due to the transitory physical nature of patching with patch cords, recall capability similar to that obtainable for consoles has not been produced for patch bays. Prior art systems such as that presently being installed by Air Studios in Lyndhurst, England, attempt to automate and record patching in various patch bays by creating an additional signal path in the patch cable with associated signal circuitry within each patch jack panel. The Air Studio's system is exemplary of this approach wherein cable conductors and jacks normally used for system grounding are employed for the additional signal path desired for recording patches. This approach is unsatisfactory due to its impingement on the grounding requirements for many patch bays or the requirement for additional conductors in the patch cables to support the additional signal requirement. Noise created in implementations using the grounding conductors further affects both the recording signal circuit, the grounding circuit and potentially, the signal carried in the patch.

The capability to accommodate a separate recording signal for patch connections further requires modification or original design in the patch jacks to accommodate this requirement. Existing patch bays would require retrofitting of entire jack assemblies to incorporate this recording approach.

The present invention alleviates the shortcomings of the prior art and provides a noncomplex patch recording system which may be easily retrofitted to existing patch bay jack panels.

SUMMARY OF THE INVENTION

The present invention provides a patch bay interconnection data storage and recall system which includes multiple detectors uniquely associated with each jack in the patch panel which detect presence of a plug in the associated jack. In a preferred embodiment, light sources and photodetectors are employed as the connection sensor. The connection sensor provides a signal identifying that a connection has been made when a plug is inserted in the jack. A controller which incorporates a receiver for the connection signals stores each consecutive connection signal in a memory. Since each connection signal is uniquely identified with a jack in the panel, the stored connection signals are subsequently retrieved by the controller and a patch signal corresponding to the retrieved connection signal, indicating a unique jack for the patch to be reconstructed, is provided by the controller. The invention incorporates a signalling system to identify the patch signal from the controller to the operator/technician. The embodiment of the invention employing light sources and photodetectors as the connection sensor allows the light source to serve a supplemental purpose as the means for transmitting the patch signal by increasing the intensity or blinking of the light source to identify the desired patch location corresponding to the retrieved connection signal. A VDU and synthesized voice system operated by the controller provide alternative signaling systems to notify the operator/technician of the desired patch.

DETAILED DESCRIPTION OF THE INVENTION

Figure 1A:
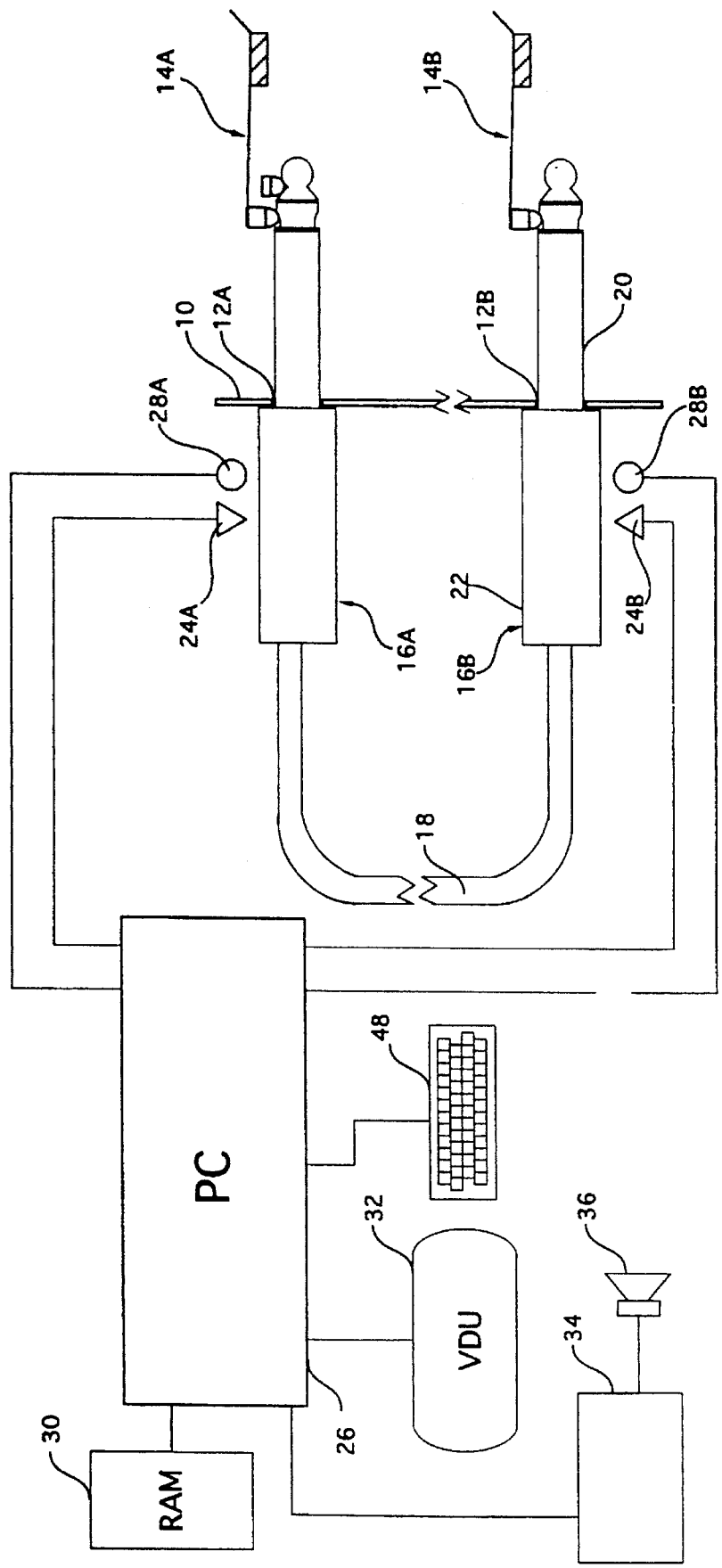
FIG. 1A is a block diagram showing the general elements of the present invention.

Referring to the drawings, FIG. 1A provides a block diagram of an embodiment of the present invention. A patch panel 10 is shown which is typical of video or audio patch panels in a patch bay. The panel incorporates jack apertures 12A and 12B and associated electrical contacts 14A and 14B. Patches are created in the panel by inserting a patch cord having plugs 16A and 16B into the jacks. A cable or conductor 18 extending between plugs constitutes the patch. The plugs consist of a conductor barrel 20, which extends through the jack aperture for contact with the jack contact. Those skilled in the art will recognize that multiple contacts may be associated with each plug conductor which may in turn incorporate a number of conductive sleeves with intermediate insulation. Each plug incorporates a handle 22, which extends external to the jack for manipulation of the plug for connection and disconnection.

Plug sensors 24A and 24B are provided for each jack. The plug sensors detect the presence of a plug in the jack and provide a signal to a controller such as microprocessor 26 which may be incorporated in a standard personal computer. In a preferred embodiment of the invention, jack indicators 28A and 28B are associated with each jack.

In operation, patches which are created on the panel are made by inserting one plug of the patch for example, plug 16A which is detected by detector 24A. The signal generated by detector 24A is received by the microprocessor which stores the detected connection in a random access memory 30 or other storage means such as a disk. The microprocessor associates each detector with a specific jack in the panel for reference. Upon insertion of the second plug 16B of the patch, by the operator, detector 24B is activated providing a signal to the microprocessor which is also stored by the microprocessor in the RAM. In addition, as a consecutive connection, the microprocessor stores a cross-reference between the two jack locations to identify the patch which has been created. The cross-referenced jack locations and patches create a patch file stored in the computer memory. The patch file incorporates all patches resulting from patch bay set-up by the operator. To recreate the patches in a bay, the microprocessor recalls from memory the connection signals with cross-referenced jack locations. The microprocessor provides a patch signal sequentially to each jack location through the indicators.

When recalling and resetting the patch, the microprocessor provides the patch signal to draw the attention of the operator to one or two specific jacks at a time where a plug is to be inserted or removed to create a patch. These jacks are identified as the "target jacks." Once the required patch has been made/removed in the target jacks the microprocessor provides patch signals for the next set of target jacks. For example, if the recalled patch comprises a connection between jacks 12A and 12B the microprocessor provides a patch signal through indicator 28A for insertion of plug 16A, as detected by detector 24A, the microprocessor also provides a patch signal to indicator 28B signifying the jack location for completion of the patch. Insertion of plug 16B completes the patch as detected by detector 24B.

The present invention employs alphanumeric designations for each jack in the panel as supplemental or alternative indication of a proper patch. The microprocessor displays on a video display unit (VDU) 32 the alphanumeric designations of the jacks comprising the patch. As displayed on the VDU each alphanumeric designation comprises a patch signal and sequencing of the patches is designated, for example, by highlighting the alphanumeric jack designator, if both jack designators are displayed simultaneously, or displaying each jack designator individually until a plug connection is accomplished. Deleting the designator highlight, altering the color or other means is employed by the microprocessor to confirm the connection as indicated by the detector associated with each jack.

As an alternative or in addition to the VDU, a voice synthesis system 34 is employed which receives the alphanumeric designation for each jack in a patch sequence from the microprocessor, and converts the digital alphanumeric designation to a synthesized voice which is announced to the operator through speaker 36. In a preliminary embodiment voice synthesis is accomplished by recording words in separate sound files which are then sequentially played to create the desired utterance. As exemplary of operation of the voice synthesizer, the microprocessor generates consecutive signals as follows: as the patch signal, an utterance is created by the voice synthesizer "Connect plug to jack A 36." Upon detection of plug insertion by the operator in that jack, the microprocessor creates an utterance for the voice synthesizer of "Plug A 36 connected." The next utterance created by the microprocessor is to complete the patch and is of the form "complete the patch by inserting the second plug in jack E 44." The "plug A 36 connected" or the "complete patch . . . " utterances alert the operator that only a first connection of a patch has been made, to avoid dangling cable problems. Upon insertion by the operator of the second plug in jack E 44 the microprocessor creates the utterance for the voice synthesizer "Plug inserted in jack E 44. Patch complete." Alternative embodiments provide the capability to functionally identify each jack, for example, "Mic line#13" as opposed to merely providing an alphanumeric designation.

Figure 1B:
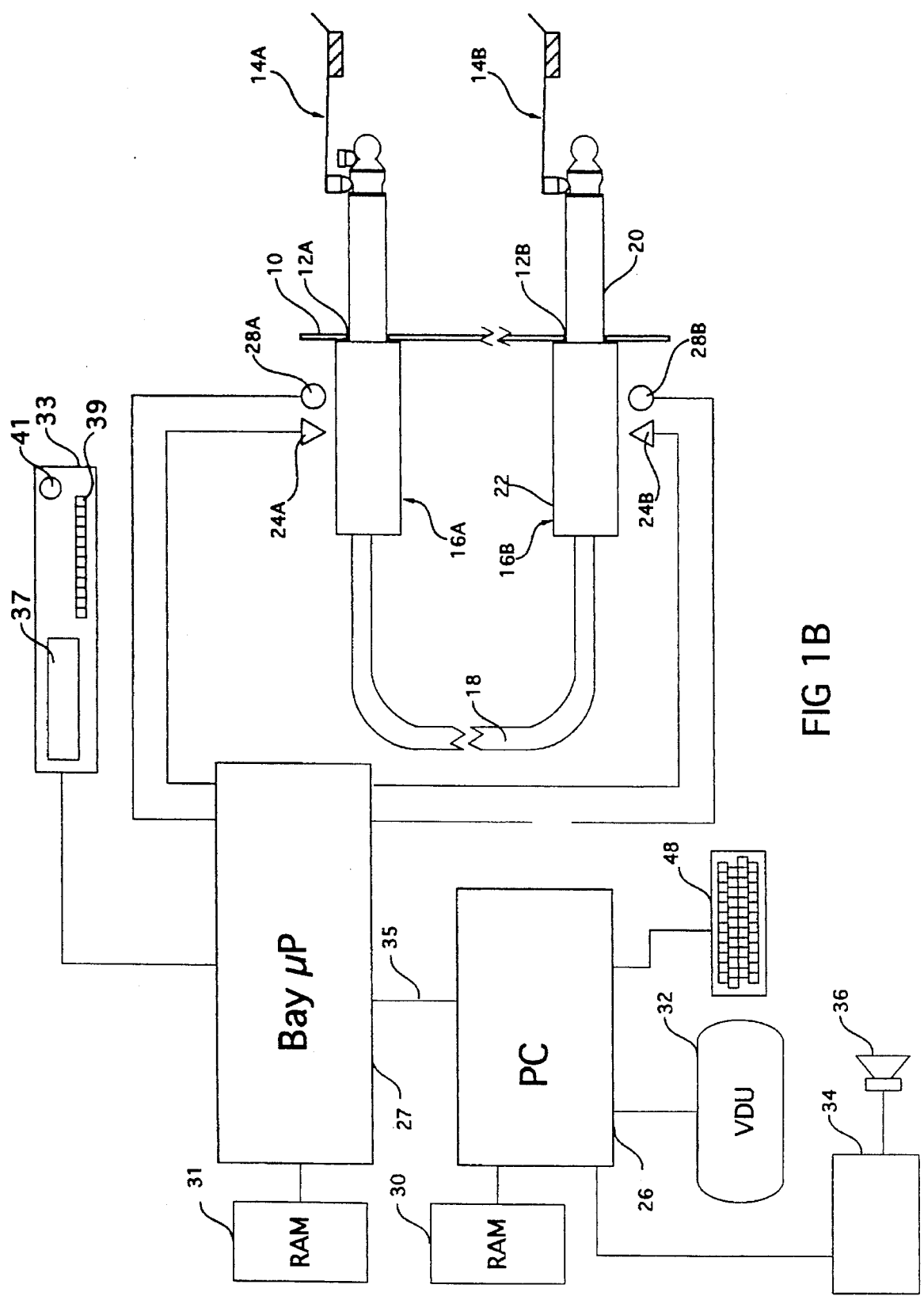
FIG. 1B is a block diagram showing the general elements of a second embodiment of the present invention employing two microprocessors.

An alternative embodiment of the invention is shown in FIG. 1B, wherein two microprocessors are employed for control of the system. Microprocessor 26 and its associated RAM, VDU and keyboard comprise a personal computer which may be located remotely from the patch bay. A bay microprocessor 27 provides either duplicate capability or shared capability with microprocessor 26 as previously described for plug detection through detectors 24A and 24B and patch signaling through indicators 28A and 28B. A separate RAM 31 is provided for the bay microprocessor 27 and communication with the microprocessor 26 in the personal computer is accomplished through an RS 232 interface 35 or other standard communication channel. A switch panel 33 mounted in the bay provides a display 37 and control switches 39 to provide functions of the VDU and keyboard for the operator at a rack in the bay. A sounder 41 is provided in the panel to accommodate alerts or alarms, to be described in greater detail subsequently, and accommodates a speaker for the voice synthesis system. Functions previously described with regard to microprocessor 26 are accomplished by bay microprocessor 27 and associated display panel 33. The personal computer employing microprocessor 26 can be employed for other disassociated operations or turned off without affecting operation of the invention as shown in the embodiment of FIG. 1B. In cases where the personal computer software is not running at all times, upon wake up of the PC application, communications are established with the bay microprocessor and via a communications request from the personal computer, any existing patch list will be transmitted to the PC updating the PC patch files.

Figure 2A:
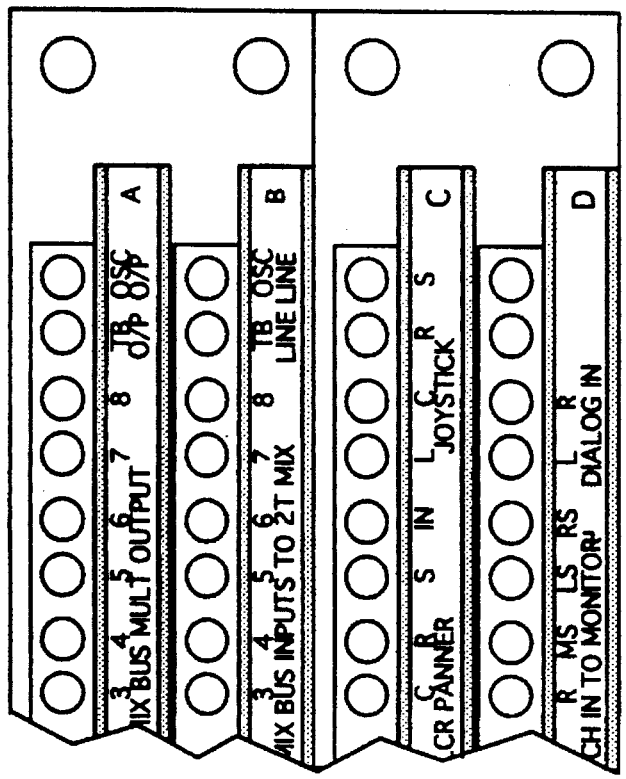
FIG. 2A is a front view of a jack panel incorporating designation strip holders in which the present invention may be incorporated.
Figure 2A:
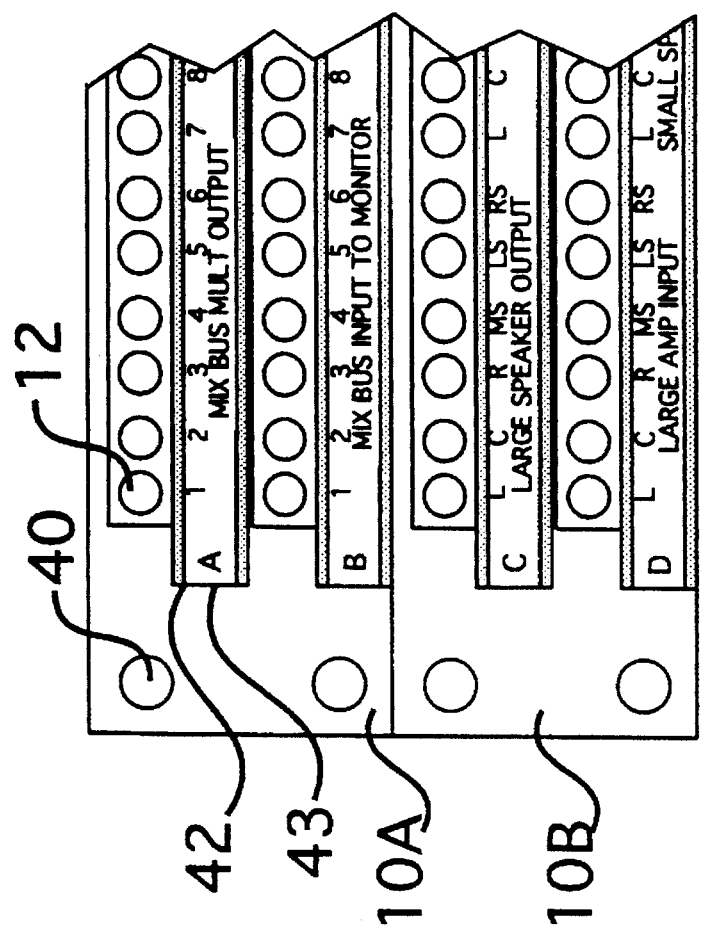

Patch bays typically comprise multiple patch panels arranged in racks or desks with connection to the various speakers, amplifiers, recorders, effects units or other equipment employed by the particular audio or video application. A typical double row audio patch bay is shown in FIG. 2A. The particular example shown is provided for a standard 19" rack with two panels, 10A and 10B each incorporating two rows of 48 jacks generally designated 12. Panel screws are typically employed to affix the panels to the racks through apertures 40. The panels disclosed in FIG. 2A employ designation strip holders 42 that contain designation strips 43 which identify the various jacks. The alphanumeric designation for each jack is present on the designation strip and additional information concerning the jacks such as, "large speaker output," "mix bus input to monitor" etc. is provided.

Figure 2B:
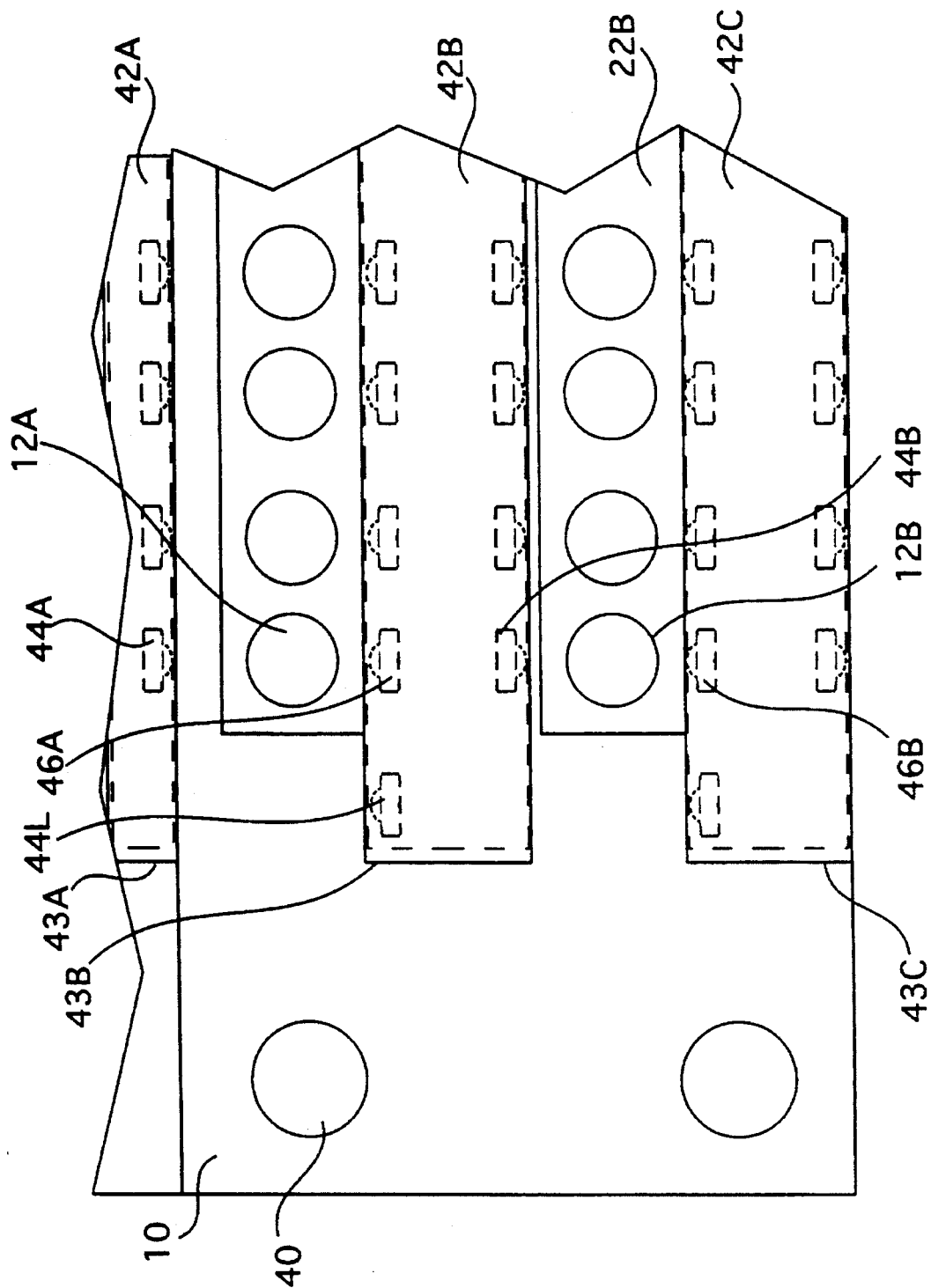
FIG. 2B is a partial view of the jack panel showing a first embodiment of the LED and photodetector arrangement for the present invention.

A first embodiment of the present invention is shown in FIG. 2B representative of jack apertures 12A and 12B. Each jack has an associated plug detector. Photodetectors comprising phototransistors 44A and 44B in cooperation with light emitting diodes 46A and 46B comprise the connection detectors for jacks 12A and 12B respectively. In this embodiment the LEDs are also employed as the patch indicators for the associated jack.

Figure 3A:
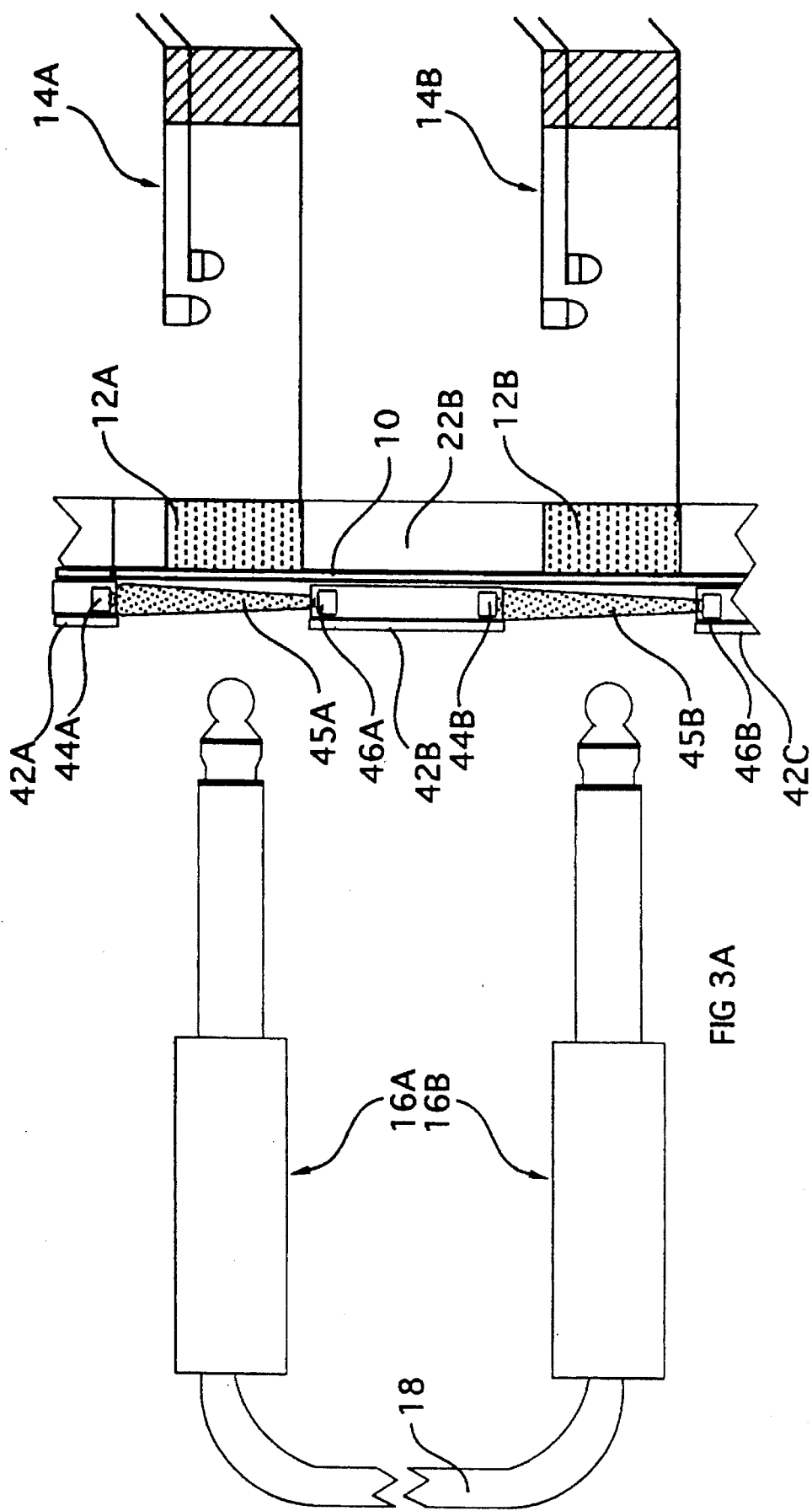
FIG. 3A is a cutaway side view of a jack panel incorporating the present invention, as installed in the designation strip holder, prior to insertion of plugs into the jacks.
Figure 3B:
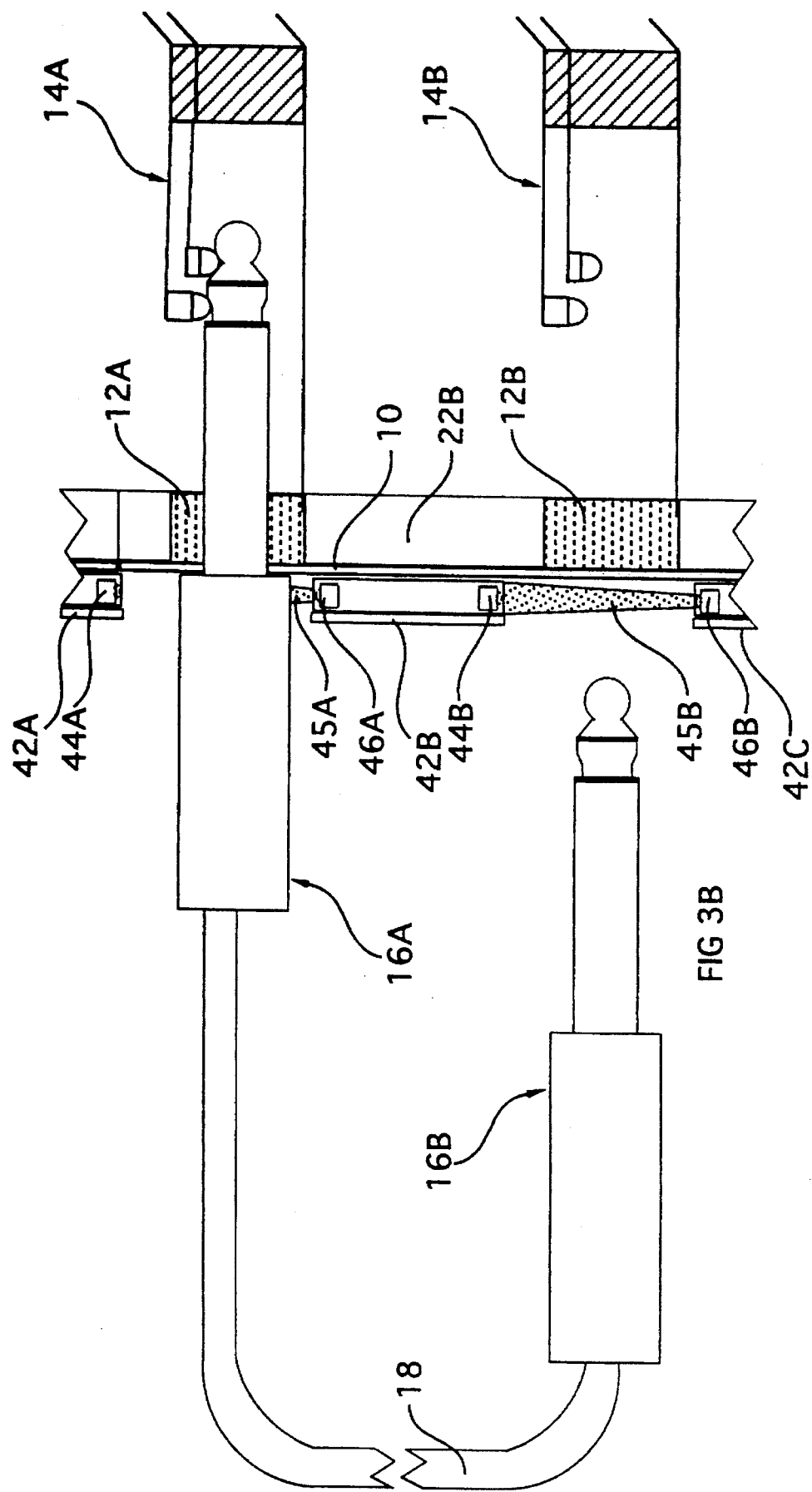
FIG. 3B is a side sectional view showing one plug inserted in a jack of the panel.

In the embodiment shown, the phototransistors and LEDs are mounted under the designation strip holders 42A, 42B and 42C. Placement of the designation strip holders adjacent the jacks in the panels allows positioning of phototransistors along the lower periphery of the designation strip holder immediately above the associated jack and the LEDs on the upper periphery of the designation strip holder immediately below the associated jack. As best seen in FIG. 3A, light from the LEDs is transmitted to the phototransistor across the jack aperture. As shown in FIG. 3B, insertion of plug 16A into jack aperture 12A causes the beam to impinge on the plug which interrupts the light beam from LED 46A to phototransistor 44A. Interruption of the light beam from phototransistor 44A creates the connection signal which is transmitted from phototransistor 44A to the microprocessor as previously described. The light beam from LED 46B to phototransistor 44B is uninterrupted in FIG. 3B since the second plug of the patch (16B) has not yet been inserted.

Figure 3C:
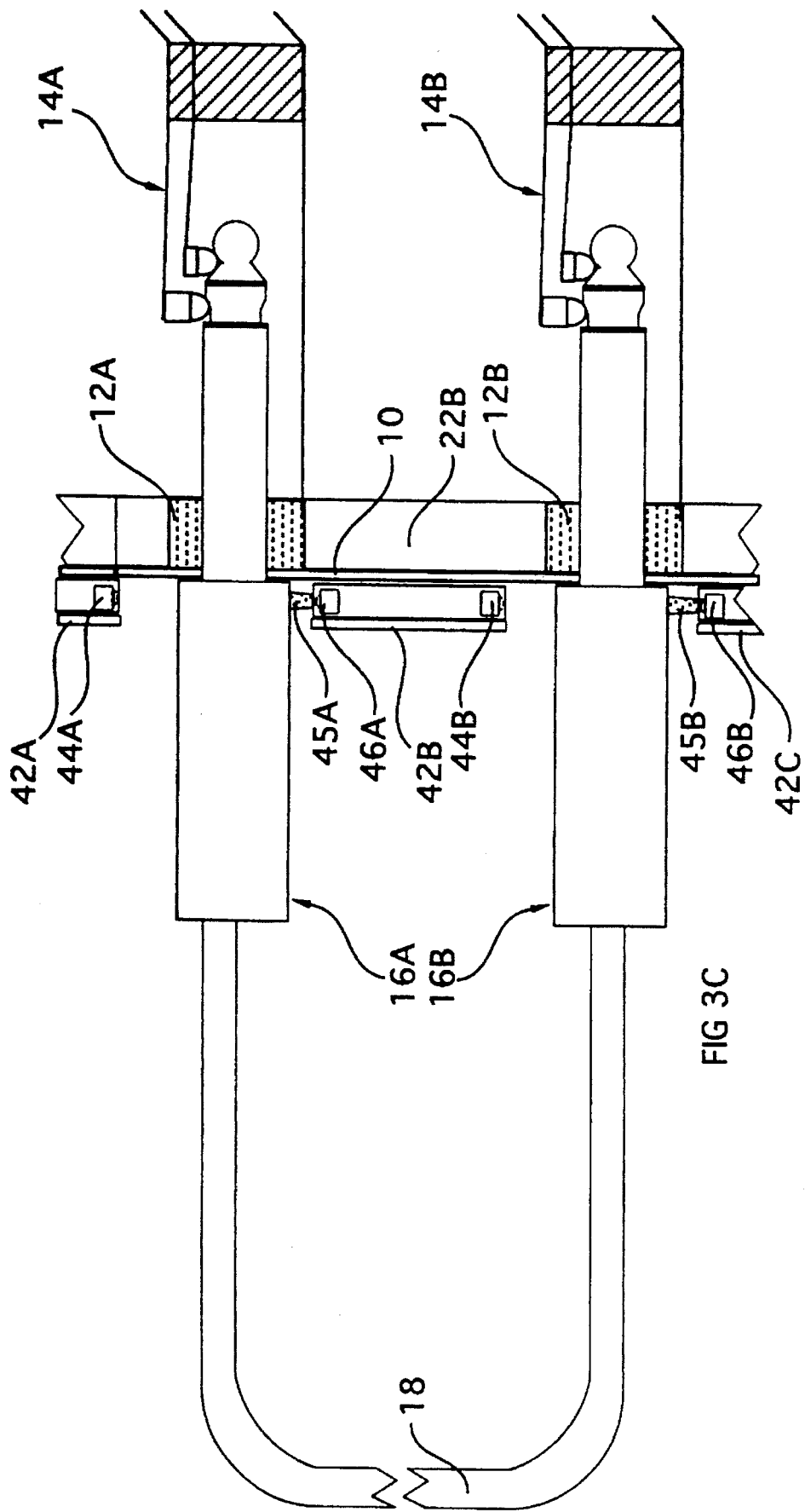
FIG. 3C is a side sectional view showing two plugs inserted in the panel forming a patch.

As shown in FIG. 3C, insertion of the second plug 16B interrupts the light beam from LED 46B to phototransistor 44B which creates the connection signal from phototransistor 44B to the microprocessor.

As implemented in this embodiment of the invention, the indicator function of the LEDs is accomplished by altering the intensity of the LED to provide a bright visible light illuminating the jack being designated or alternatively blinking the LED to draw attention to the jack location. As shown in FIG. 2B, an additional LED, exemplified by LED 44L, is provided at the end of each designation strip holder which is not associated with any particular jack. This supplemental LED is activated by the microprocessor to designate the row in which the jack is present as a further indication of the jack location.

The designation strips for use with an alternative embodiment of the invention, additionally employ transparent or translucent sections adjacent the LEDs for added visibility of the indication signal. The alphanumeric designations for each jack are incorporated as a portion of this translucent or transparent section.

The embodiment of the invention disclosed in FIGS. 2A–C and 3A–C is fully integrated in conjunction with the designation strip holder. Consequently, the invention may be retrofitted to existing jack panels by mounting of designation strip holders over printed circuit boards configured with LEDs and phototransistors and associated wiring for the present invention, as will be described in detail subsequently, or replacement of existing designation strip holders with specially configured units.

Figure 4:
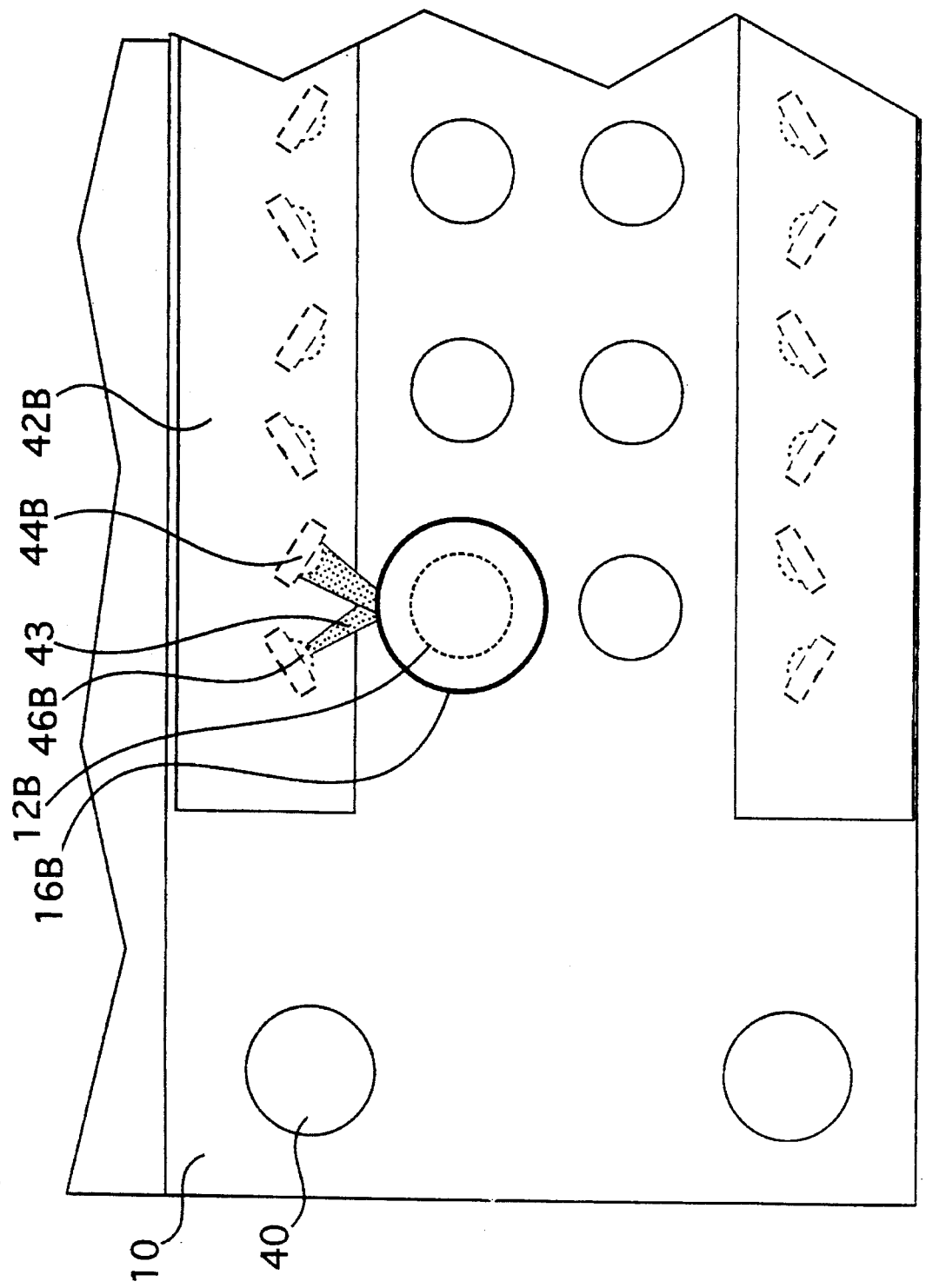
FIG. 4 is a partial front view of a jack panel incorporating video jacks and a second embodiment of the present invention employing adjacent mounting of light source and photodetector for reflective sensing of plug insertion.

A second embodiment of the invention is shown in FIG. 4 with particular application to certain video jack panels (and other similarly configured jack panels). The arrangement of typical video patch panels places jack pairs immediately adjacent one another for use with typical video normalling plugs. This configuration of jacks renders mounting of phototransistors or LEDs intermediate the jacks impossible. Consequently, the embodiment shown in FIG. 4 employs reflection of the light beam as opposed to interruption to provide plug detection. LED 46B is mounted in the designation strip holder immediately adjacent phototransistor 44B. The LED and phototransistor are arranged at opposite angles to the vertical such that insertion of plug 16B in jack 12B causes light beam 43 to impinge on the plug and be reflected from the LED to the phototransistor. If the plug is not inserted in the jack, the light beam will not be reflected onto the phototransistor thereby indicating an empty jack.

The LEDs employed in the embodiment of the invention disclosed in the drawings are visible spectrum LEDs with sufficient output in the infrared portion of the light spectrum to be properly detected by the phototransistors. In normal operation the microprocessor monitors the phototransistors of the patch bay to determine if new patches are being made or existing ones removed. This is accomplished by strobing or illuminating the LEDs one at a time at a rapid rate and monitoring the output of the phototransistors associated with each LED. The rate of scanning is sufficiently high so as to detect a change in the patch quickly. The scan rate and duty cycle also effect visibility of the LED to the operator. During monitoring of the patch bay, the duty cycle is maintained at a level high enough for accurate detection by the phototransistors but low enough to preclude perception of light from the LEDs by the operator.

For the arrangement of LEDs and phototransistors in either embodiment disclosed previously, light from one LED may strike phototransistors other than the one associated with that LED and jack. Avoidance of false detection is accomplished in the present invention by grouping of the jack/LED/phototransistors for the purposes of scanning, to accomplish physical separation of jacks in the scanning sequence. During scanning the microprocessor steps through the groups, turning on LEDs associated with that group and stepping through phototransistors for that group for monitoring. Grouping by fours in the embodiment shown in the drawing, was selected based on empirical data indicating that over the distances involved, light from individual LEDs does not strike more than two phototransistors on either side of the target phototransistor with sufficient intensity to be detected. Should installation of the invention in a given patch bay present additional divergence, wherein phototransistors more than two detectors away from the target will be activated, the fineness of the grouping will be adjusted accordingly.

Figure 2C:
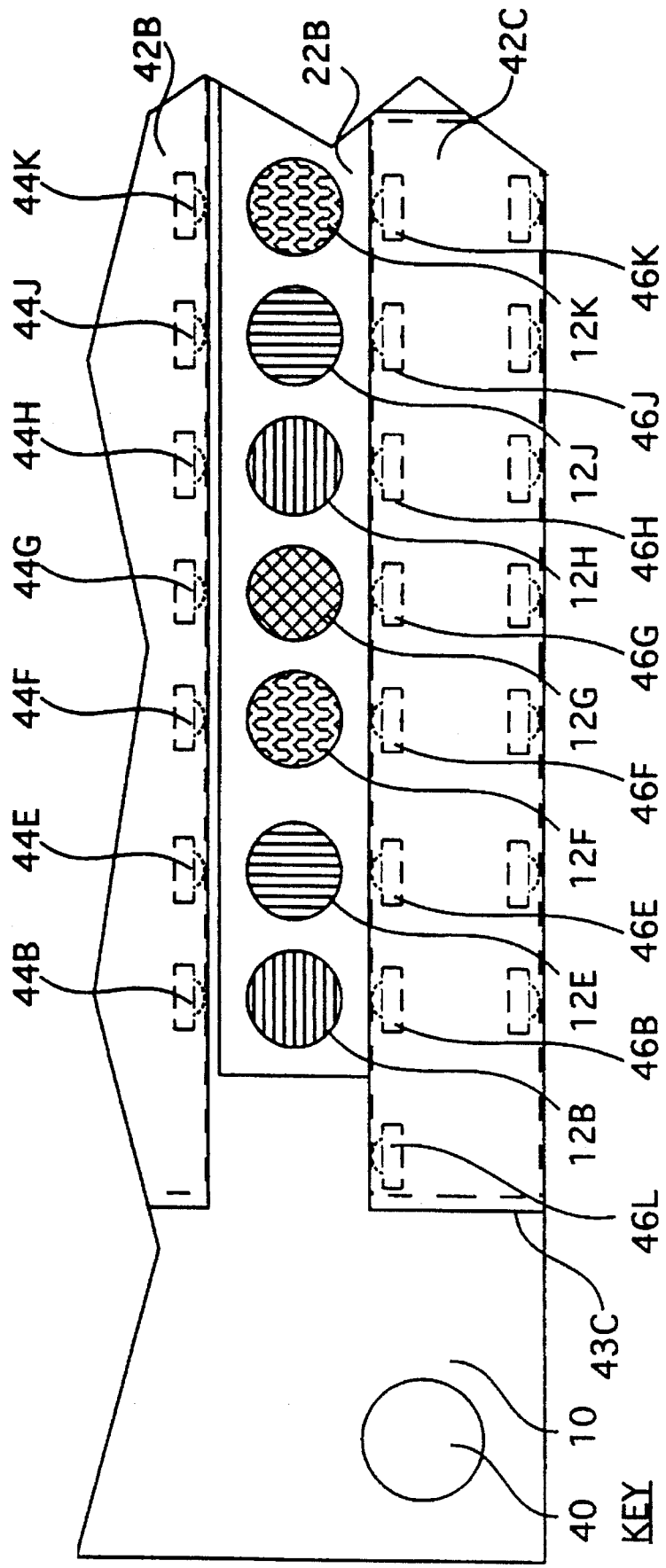
FIG. 2C is a partial front view of a jack panel identifying group designations for jacks in the panel.

As shown in FIG. 2C, one embodiment of the present invention employs groups of four jacks identified by shading as groups 1, 2, 3, and 4. Group 1 includes jacks 12B and 12H with associated LEDs and phototransistors 46B, 44B and 46H, 44H respectively. Group 2 includes jacks 12E and 12J with their associated LED/phototransistors; group 3 incorporates jacks 12F and 12K with their associates LEDs/ phototransistors; etc. Scanning of the phototransistors by the microprocessor is accomplished in group order. For example, scanning of group 1 phototransistors will be accomplished first, scanning of group 2 phototransistors will be accomplished second etc. Thus, whereas the light from LED 46E of group 2 may scatter and fall upon detectors 44B and 44F (as well as 44E), limiting the scan to group 2 will preclude detection by those phototransistors. Similarly, when scanning group 3 while light from LED 46F may fall on detectors 44E and 44G those detectors will not be activated due to their designation in different groups not being scanned.

Figure 5:
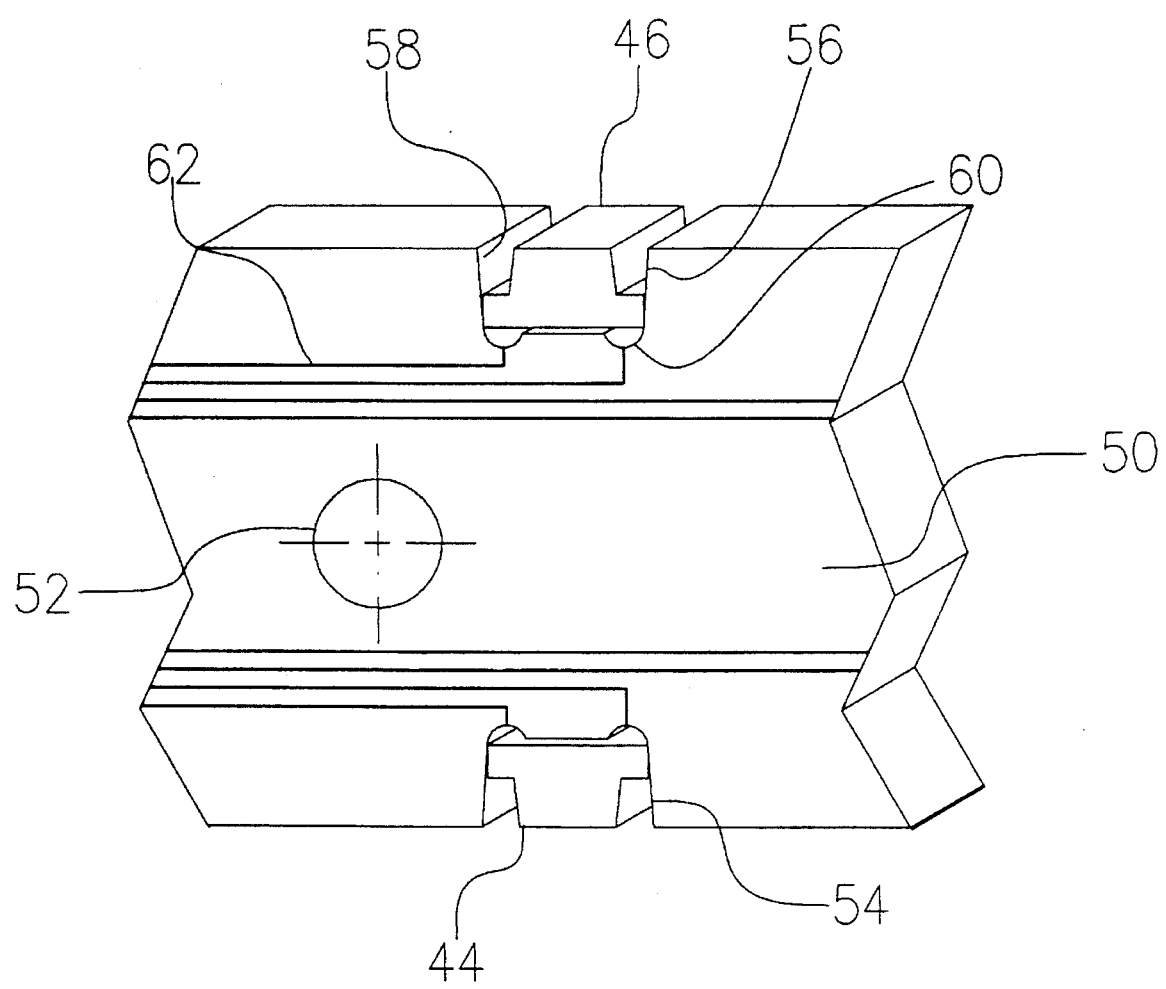
FIG. 5 is a pictorial view of a printed circuit board arrangement integrally incorporating LEDs and phototransistors as the light source and photodetector, respectively, for the present invention.

FIG. 5 discloses a printed circuit board (PCB) adapted for mounting the LEDs and phototransistors employed in the present invention. The circuit board is dimensioned to be accommodated by the designation strip holder. Mounting holes 52 allow screw mounting of the printed circuit board to the front panel or designation strip holder as required by the particular application. Phototransistors 44 are mounted in notches 54 in the bottom edge of the PCB while LEDs 46 are mounted in similar notches 56 in the top edge of the PCB. The notches employ angled sides 58 to accommodate alignment of the LEDs and phototransistors during insertion by automated equipment. The angled sides allow LED and phototransistor devices held in a vacuum pick-up of an auto placement machine to "drift" into place by sliding on the vacuum pick-up while the device is placed into position on the PCB.

The notches in the PCB also incorporate wells 60 to accommodate solder paste. Due to the mounting of the LEDs in the edges of the circuit board, normal approaches for depositing of solder paste on the surface cannot be employed. The wells in the notch allow the solder paste to be applied after the part is placed in the notch. The PCB assembly is then heated allowing solder to flow into the well between the LED or phototransistor and PCB creating an electrical and physical connection. Traces 62 on the printed circuit board provide electrical connection to the LEDs and phototransistors for circuit connection.

Figure 6:
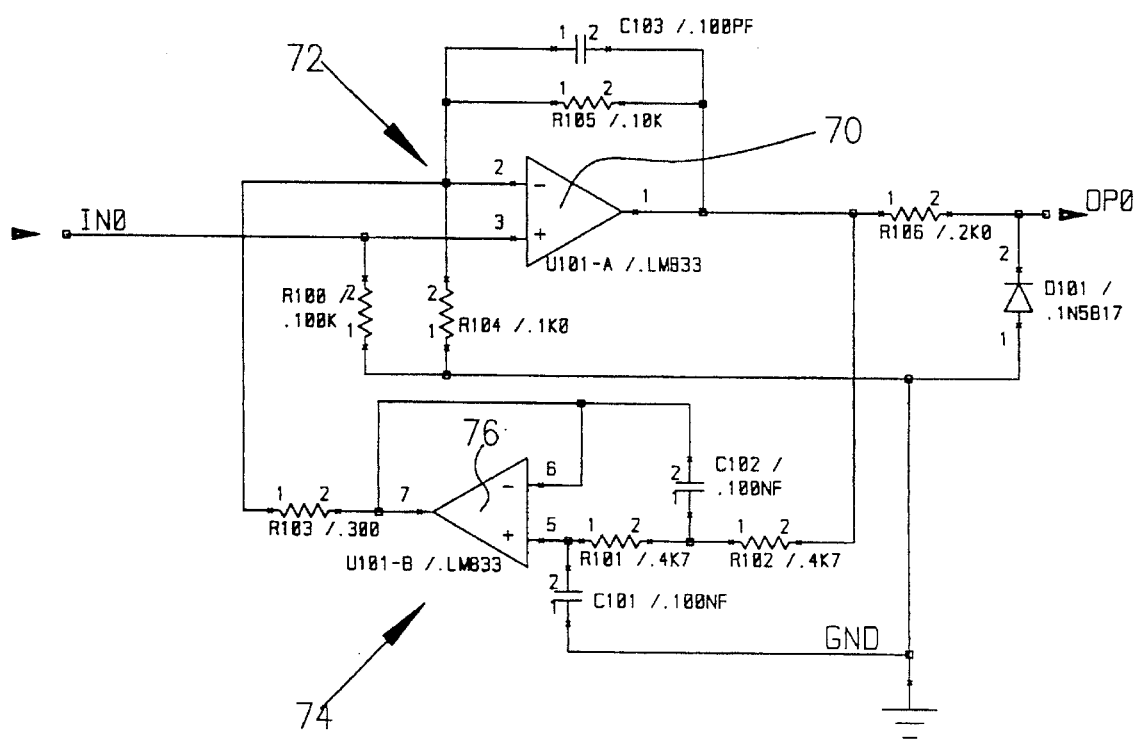
FIG. 6 is a schematic diagram for an amplifier arrangement with feedback for signal detection from the photodetector with ambient light compensation.

Further signal manipulation is employed in the present invention to preclude false detection by the phototransistors in the system. Each patch data line from the phototransistor to the microprocessor system is routed through an input buffer amplifier as shown in FIG. 6. Signal input IN0 is provided to the non-inverting input of amplifier 70 which provides the output signal OP0 to the microprocessor system. The design disclosed in FIG. 6 is "self-regulating" to accommodate changing ambient light conditions. Partial feedback of the output signal is accomplished with a low pass filter circuit 74 employing a non-inverting amplifier 76 which provides a phase adjustment at node 72. The portion of the output which is fed back, provides a more inverted return signal at low frequencies. Normal daylight will produce a DC current in the phototransistor. This current will be eliminated or greatly reduced by the inverted return signal. Similarly with artificial lighting a pulsed 50 or 60 hertz DC current would normally be generated. By low pass filtering, the pulsed DC is also eliminated or greatly reduced.

Application of the inverse low pass current allows the high frequency strobe of the LEDs to pass unimpeded to the following hardware in the microprocessor system allowing rapid detection of open or closed patches with a single strobe of the LED and without the necessity for infrared lenses over the phototransistors.

This approach is different to typical infrared detection. Typical infrared detection strobes the emitter a high frequency of 30 kHz to 40 kHz and ANDs the strobe with a pulse train to produce bit stream of about 1000 baud. The output from the emitters is greatly reduced at this frequency, requiring up to 100 db of amplification to detect the output. The detected signal further has to be conditioned and converted to a squared wave. This square wave is then compared against the strobing signal to detect if the emitter is on. This pulse train is then decoded by the processor to determine the action desired. A typical infrared detection, as in a television remote, has one emitter circuit and one detection circuit. The proposed invention can have upwards of several thousand emitters and a like number of detectors. If the typical method of detecting were to be employed, the lag time for each detector could be several seconds. The invention uses emitters in the visible light spectrum, the infrared output from these devices is even more severely limited at 30 to 40 kHz. An optimum frequency of approximately below 4 kHz gives a maximum infrared output from the emitters. This frequency is low enough that transient information on the AC power lines does not give rise to false detection problems, as would be the case at 40 kHz. In addition, the infrared output of the emitters is several orders of magnitude greater, requiring only 33 db of amplification. At this level of amplification, the transient information on the AC power lines does not cause false detection. The invention is able to reduce the interference from transients by means of a simple low pass filter consisting of C103 in parallel with R105 for amplifier 70 as shown in FIG. 6.

Amplifier 70 is configured as a differential amplifier. Input current is applied to the non-inverting terminal and amplified by 33 db as set by feedback resistor R105 and gain resistor R104 in parallel with resistor R103, resistor R100 provides DC bias for the non-inverting input of amplifier 70, without which, the output would rise to the positive rail voltage. Capacitor C103 provides a single pole low pass filter with a corner frequency of 160 kHz for amplifier 70. This enhances the stability of amplifier 70 and additionally, reduces transient pulses, reducing the possibility of false triggering. Amplifier 76 is configured as a two pole low pass filter with a corner frequency of approximately 330 Hz. The output of amplifier 76 is returned to the inverting input of amplifier 70 resistor R103 where it is differentiated with the input signal. Any frequency below the corner frequency, will be attenuated, while those above the corner frequency will pass unimpeded. Diode D101 is a Schottky diode to remove any negative pulses from the output of the circuit to the microprocessor. Output resistor R106 limits the current which can flow in diode D101 and to the microprocessor.

Alternative embodiments of the present invention employ capacitive or pressure sensitive membrane switches, adjacent the jacks and contacted by the handle or case of a plug inserted in the jack, as the connection and/or disconnection signal generator.

Use of a microprocessor system with associated memory for storage of connection signals and associated jack identifications for the patches performed, allows the capabilities for the additional features of the present invention which, in the embodiment shown in the drawings, are implemented through software. The system monitors the detectors for a change of state either connection or disconnection creates a change of state in both embodiments for the invention disclosed. The microprocessor system updates the patch file for each change of state. The present invention requires sequential connection of patches to accommodate the patch designation. For example, insertion of a first plug into a jack providing a connection signal to the microprocessor followed by insertion of a plug from a separate patch cable leaving the second plug of the first cable dangling would create an error in the system. The present invention creates a first alert upon insertion of a first plug into a jack. The alert is presented on the VDU or in the voice synthesizer system, as previously described to identify to the operator that a cord is "dangling." Alternatively or in conjunction, the system may continue to blink the LED associated with the first plug connection until a second plug connection is accomplished.

One embodiment of the present invention employs additional intelligence for accommodating dangling cords in the patch panel. The general rule employed by the system is that a patch is assumed for two consecutive insertions. In this case, no more than one dangling cord will be present at any one time. If dangling cords are created by unplugging existing patches, the system will detect three or more dangling cords and identify the patches corresponding to the dangling cords with a message to the operator requiring that all dangling cords must be pulled to avoid patch errors upon reconnection. Alternatively, the system may allow one dangling cord to remain with the assumption that the next plug detection will be reconnection of the second end of that dangling cord.

The system intelligence is provided in the case of two dangling cords. An exemplary situation in which this case will arise is again based on unplugging existing patches. If current patchs exists from A to B and C to D however, the desired patches are A to C and D to E, the operator may pull plug B resulting in a dangling cord from jack A. The system then assumes the active cord for purposes of patching is from jack A, patch C to D remains. If the operator then pulls plug C, two dangling cords now exist from jack A and jack D. While the system cannot accurately predict which is the active cord, the assumption remains that the first dangler from jack A is active. The system has recorded that both the patches have been disconnected and a message is provided to the operator aurally or on the VDU warning of two dangling cords. Two options exist for the operator in replugging the dangling patch cords, the system provides two assumed options; 1) if a plug is inserted into jack C the system assumes that the active dangler from A has been plugged into C and creates a patch signal A to C. The system then assumes the active cord is the dangler from jack D. If a plug is inserted in any jack other than the original four jacks the system assumes that the dangler from jack D (the second dangler) was the active cord and creates a patch signal. Assuming the operator plugged into jack E, the system creates a patch signal from D to E and then assumes the dangler from jack A is now the active cord. This logic approach will result in a correct conclusion in the majority of cases arising under this scenario. However, since the system conclusion is based on an assumption an alert is provided to the operator by the voice synthesizer or on the VDU describing the assumption made and additional aural warning such as a beep from the sounder maybe employed to draw the operator's attention to the assumption. If the system has correctly identified the patches, the operator may continue patching operations. If the assumption made by the system is incorrect, the operator pulls the patch incorrectly assumed by the system and remakes the correct patch.

The system provides a second alert when a plug is removed from a jack as detected by a change in the patch file by a disconnection signal. The second alert again may be presented on the VDU or voice synthesizer output or create a flashing LED at the jack from which the plug was removed.

In addition, to associate an alphanumerical indicator for each of the jacks by the microprocessor, additional information associated with particular jacks is stored in memory for cross-reference by the microprocessor. Individual jacks may be identified as "protected jacks" wherein insertion of a plug causes the microprocessor to issue a third alert signal via the VDU voice synthesizer or jack indicator. For example, if a jack pair in a patch bay provides feed to the transmitter of a radio station, insertion of a plug in the break jack would interrupt the feed to the transmitter. This could result in taking normal programming off the air and potentially causing numerous side effects including lost commercials, airing program material in violation of FCC rules, etc.

In addition, storage of functional information regarding each of the jacks allows detection by the microprocessor of incompatible patches. For example, plugging one end of a patch cord into a 2T bus output jack would be identified by the microprocessor and plugging the other end of the patch cord into a jack that was the output of some other stage of the circuit or some external device output would be inappropriate. The microprocessor provides a fourth alert upon detection of a patch in which inappropriate jacks are interconnected. Information regarding the jack functions is then displayed on the VDU or provided to the operator via the voice synthesizer.

Identification of jack functions by the system additionally allows reconfiguration of the patch file to accommodate differing patch bays with similar capabilities but different jack arrangement. For example, a patch file from studio A may include jacks that refer to connections to a reverb unit. In studio B the reverb unit may be associated with a different set of jacks. The present feature of the invention allows the microprocessor to automatically reconfigure the patch file to accommodate the functional identification of the jacks for studio B. In addition, comparison by the microprocessor of jack functions for two differing patch bays allows identification of equipment having differing characteristics or differing connection requirements. For example, if in studio A the reverb unit is a Yamaha system while in studio B the reverb unit is a Roland system differing connections for patches to the reverb may be required. The microprocessor reconfigures the patch file to allow its use by the operator in patching in the bay for studio B based on the studio A patch. In addition, if the Roland device has differing capabilities which may ultimately require modification to controls on the console, the microprocessor provides a fifth alert through the VDU to notify the operator of this condition.

Functional identification of the jacks further allows for capability of single end patching in the patch bay where the other plug on the patch cord is connected to outboard equipment (devices external to the console and not wired to jacks in the patch bays). The patch file is appropriately annotated to identify a single ended patch for appropriate patch signals during recall. For the embodiment shown in the drawings, a keyboard 48 is provided for initial data entry by the operator of the function/description of the outboard equipment and its designation as the second connection for the patch. The reconfigure and functional annotation features of the invention as previously described are applicable to the single ended patches provided in the system. Functional identification also allows the use of phase flip cords, attenuator cords and Y-cords in patches to be identified and annotated by the operator. Dead patches are also functionally identifiable.

In creating a patch set-up the operator will often create patches in an order based on the function which he is seeking to accomplish. Upon recall of the patch file to repatch the bay at a subsequent time, patching may be accomplished more efficiently by moving sequentially through the patch panels beginning for example, at the first row, first jack and progressing to the last row, last jack for the initial plug of each patch. The microprocessor, upon selection of this feature, re-sorts the patch file based on physical locations of the jacks and provides the operator with patch signals identifying the target jacks sequentially by physical location in the patch panel.

Creation of a patch file by the present invention is alternatively accomplished in a "tear down mode." The patch file is created by the microprocessor through monitoring of disconnection of plugs from jacks during tear down of a patch bay after completion of a session or other use for the bay. The requirement for sequential disconnection of each patch cord at both ends remains in the tear down mode, however, the first alert capability for initial disconnection of a patch is provided by the system.

Having now described the invention in detail as required by the Patent Statutes, those skilled in the art will recognize modifications and substitutions to the embodiments disclosed herein for particular applications. Such modifications and substitutions are within the scope and the intent of the present invention as defined in the following claims.

What is claimed is:

1. An apparatus for patch bay interconnection data storage and recall system comprising:
   a plurality of light sources located proximate and individually associated with a plurality of jacks in the patch bay;
   a plurality of photodetectors individually associated with the plurality of light sources and responsive to impingement of an associated light beam due to insertion of a plug in the associated jack to produce a connection signal;
   a controller having
      means for receiving the connection signals during a first patch bay setup and storing consecutive connection signals in a memory;
      means for retrieving the stored connection signals during a subsequent patch bay setup;
      means for providing a patch signal corresponding to a retrieved connection signal; and
   means for transmitting patch signals to prompt an operator to make a connection corresponding to the patch signal.

2. An apparatus as defined in claim 1 wherein the means for transmitting patch signals comprises means for blinking a one of the plurality of light sources corresponding to the connection signal.

3. An apparatus as defined in claim 2 wherein the means for transmitting patch signals further comprises a video display and the patch signal includes alphanumeric designation of the jack associated with the defined one of the plurality of light sources for display on the video display.

4. An apparatus as defined in claim 1 wherein the means for transmitting patch signals comprises a voice synthesizer for announcing an alphanumeric designation and the patch signal includes alphanumeric designation of the jack associated with the defined one of the plurality of light sources.

5. An apparatus as defined in claim 1 wherein the plurality of light sources are mounted to a face of a front panel in which the associated jacks are mounted.

6. An apparatus as defined in claim 5 further comprising a designation strip holder mounted to the face of the front panel and wherein the light sources are integral with the designation strip holder.

7. An apparatus as defined in claim 1 wherein each one of the plurality of light sources and each associated one of the photodetectors are mounted on opposite sides of the associated jack and the connection signal is generated responsive to interruption of the light beam between the source and photodetector by insertion of a plug into the jack.

8. An apparatus as defined in claim 1 wherein each one of the plurality of light sources and each associated one of the photodetectors are mounted substantially adjacent to one another proximate the associated jack and the connection signal is generated by reflection of the light beam from a plug inserted in the jack to the photodetector.

9. An apparatus as defined in claim 1 wherein the plurality of light sources and associated photodetectors are segregated into groups such that members of a group are located distal from one another and the means for receiving connection signals samples each group separately, said apparatus further comprising means for illuminating light sources in each group separately and coincident with the sampling of that group by the receiving means.

10. An apparatus as defined in claim 1 wherein the receiving means further comprises means for designating a connection external to the patch bay as one of a pair of consecutive connection signals.

11. An apparatus as defined in claim 1 wherein the receiving means further comprises means for designating a functional identification of a patch.

12. An apparatus as defined in claim 1 wherein the photodetectors each comprise:
   a phototransistor; and
   an input amplifier having;
      a non-inverting amplifier receiving an input from the phototransistors and an output to the receiving means of the controller;
   means for low pass filtered feedback on the non-inverting amplifier and means for feedback phase modification on the non-inverting amplifier; and
   wherein the system further comprises means for strobing the plurality of light sources at high frequency.

13. An apparatus as defined in claim 6 wherein the light sources comprise light emitting diodes (LEDs) and said designation strip holder incorporates a printed circuit board having notches in the edge thereof each of said notches located adjacent a jack and each notch adapted to receive an LED.

14. An apparatus as defined in claim 13 wherein said notches include angled sides for urging each LED into alignment with the adjacent jack;
   said notch further having a bottom with notch wells for receiving solder paste for interconnection of said LED to signal traces on the printed circuit board.

15. An apparatus as defined in claim 6 wherein the photodetectors are integral with the designation strip holder.

16. An apparatus as defined in claim 15 wherein the photodetectors comprise phototransistors and said designation strip holder incorporates a printed circuit board having notches in the edge thereof each of said notches located adjacent a jack and each notch adapted to receive a phototransistor.

17. An apparatus as defined in claim 16 wherein said notches include angled sides for urging the phototransistors into alignment with the adjacent jack;
   said notch further having a bottom with notch wells for receiving solder paste for interconnection of said phototransistor to signal traces on the printed circuit board.

18. A method for operation of a patch bay interconnection data storage and recall system which incorporates plug detectors individually associated with a plurality of plug jacks in the patch bay and providing a connection signal upon insertion of a plug, the method comprising the steps of:
   receiving the connection signals during a first patch bay setup;
   storing consecutive connections signals in a memory;
   retrieving the stored connection signals during a subsequent patch bay setup;
   providing a patch signal corresponding to a retrieved connection signal; and
   transmitting patch signals to prompt the operator to make a connection corresponding to the patch signal.

19. A method as defined in claim 18 further comprising the steps of:
   receiving a connection signal for a first one of a consecutive pair of connection signals;
   generating an alert responsive to said first one of the connection signals;
   receiving a second one of a consecutive of pair of connection signals; and
   generating a patch complete notification.

20. A method as defined in claim 18 further comprising the steps of recalling said first one and second one of the consecutive pair of connection signals;
   transmitting a first patch signal corresponding to the first one of said retrieved connection signals;
   receiving a connection signal corresponding to said first patch signal;
   transmitting a second patch signal corresponding to said second one of said retrieved connection signals; and
   generating a second alert identifying the second patch signal as completing a patch.

21. A method as defined in claim 18 wherein the plug detectors of the patch bay interconnection data storage and recall system further produce a disconnect signal and the method comprises the additional steps of receiving a disconnect signal corresponding to a previously stored connection signal and generating a third alert signal responsive to receiving the disconnect signal.

22. A method as defined in claim 18 wherein the method further comprises the steps of:
   storing jack signal functions;
   comparing connection signals to stored jack signal functions to determine incompatible connections; and
   generating a fourth alert responsive to a determination of an incompatible connection.

23. A method as defined in claim 22 further comprising the steps of:
   storing jack signal functions for at least two patch bays;
   comparing received connection signals to said stored jack signal functions;
   associating said connection signals to said stored jack signal functions for a first one of said patch bays;
   transforming said associated connection signals to said stored jack signal function for a second one of said patch bays; and
   providing a patch signal based on the transformed connection signal.

24. A method as defined in claim 20 further comprising the steps of:
   detecting disconnection signals;
   storing consecutive disconnection signals in the memory;
   retrieving the stored disconnection signals;
   providing a patch signal corresponding to the retrieved disconnection signals; and
   transmitting the patch signals.

25. A method as defined in claim 18 further comprising the steps of:
  resequencing the stored connection signals based on patch bay configuration for ordered retrieval;
  retrieving the stored connection signals in the resequenced order;
  providing patch signals corresponding to the retrieved connection signals; and
  transmitting the patch signals.

* * * * *